Oct. 21, 1958 — A. E. WHITECAR — 2,857,039
AMPULE ORIENTING DEVICE
Filed Aug. 22, 1957 — 4 Sheets-Sheet 1

FIG. I.

INVENTOR.
ALTEN E. WHITECAR
BY
ATTORNEYS

INVENTOR.
ALTEN E. WHITECAR

Oct. 21, 1958     A. E. WHITECAR     2,857,039
AMPULE ORIENTING DEVICE

Filed Aug. 22, 1957     4 Sheets-Sheet 3

INVENTOR.
ALTEN E. WHITECAR
BY
ATTORNEYS

Oct. 21, 1958        A. E. WHITECAR        2,857,039
AMPULE ORIENTING DEVICE
Filed Aug. 22, 1957        4 Sheets-Sheet 4

INVENTOR.
ALTEN E. WHITECAR
BY
ATTORNEYS

United States Patent Office 2,857,039
Patented Oct. 21, 1958

2,857,039

AMPULE ORIENTING DEVICE

Alten E. Whitecar, Westville, N. J., assignor to Smith, Kline & French Laboratories, Philadelphia, Pa., a corporation of Pennsylvania Application August 22, 1957, Serial No. 679,556

10 Claims. (Cl. 198—33)

This invention relates to a device for orienting ampules so that all of their necks extend in the same direction. This operation is necessary for various procedures carried out in connection with ampules such as, for example, testing and packaging.

In accordance with this invention, ampules are loaded into the orienting device in accordance with this invention with their necks extending in one of two directions. Then all of the necks extending in a predetermined direction are engaged so as to raise the ampules and reverse them to a position with the necks extending in the opposite direction.

Reference may now be had to the drawings in which.

As shown in the figures, an ampule orienting device 2 in accordance with this invention is provided with a supply hopper 4 and a central plate 6. Hopper 4 discharges into a fence member 8 which directs the ampules in a general radial direction to the outer circumference of plate 6.

Figure 1:
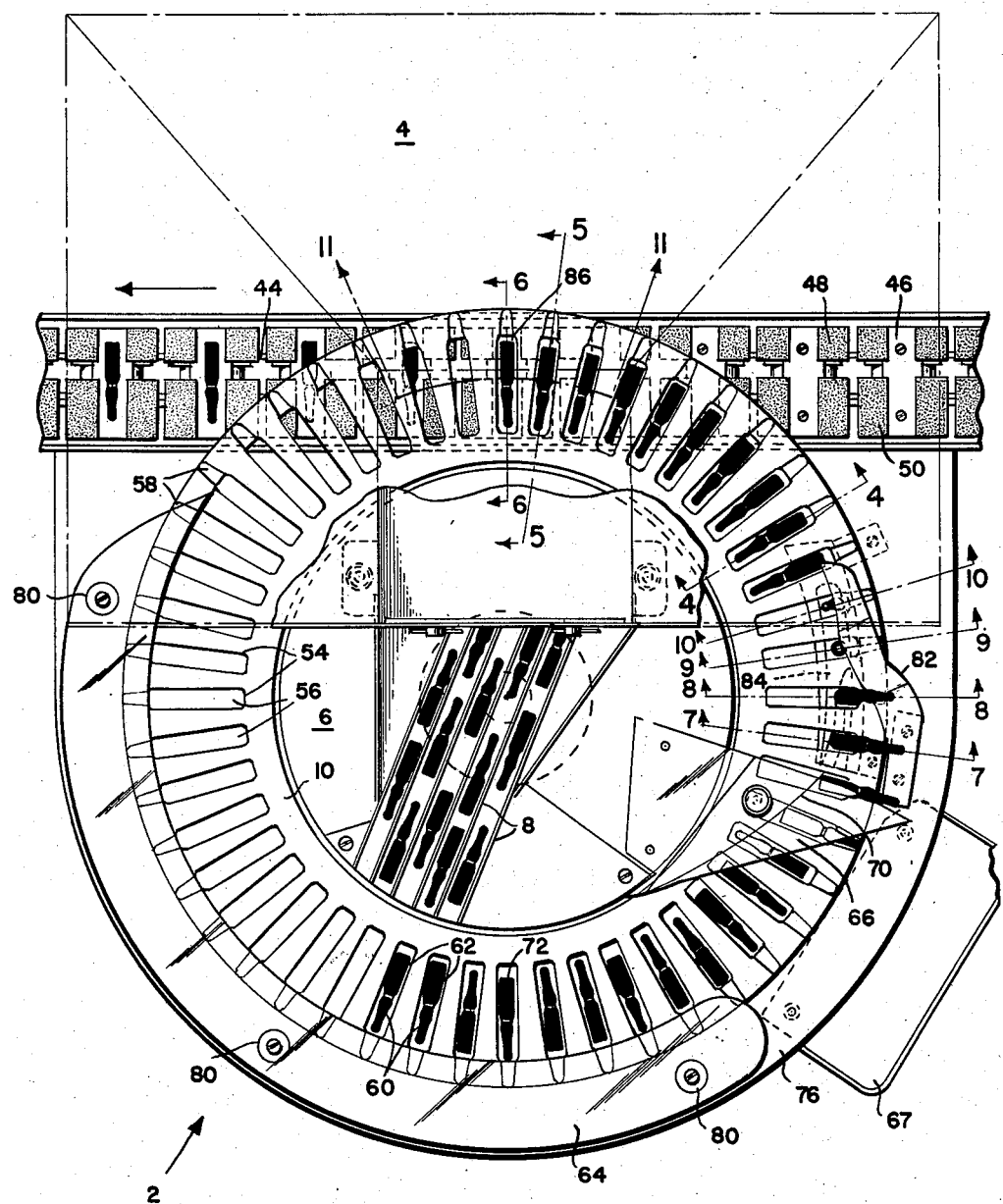
Figure 1 is a plan view of an ampule orienting device in accordance with this invention.
Figure 2:
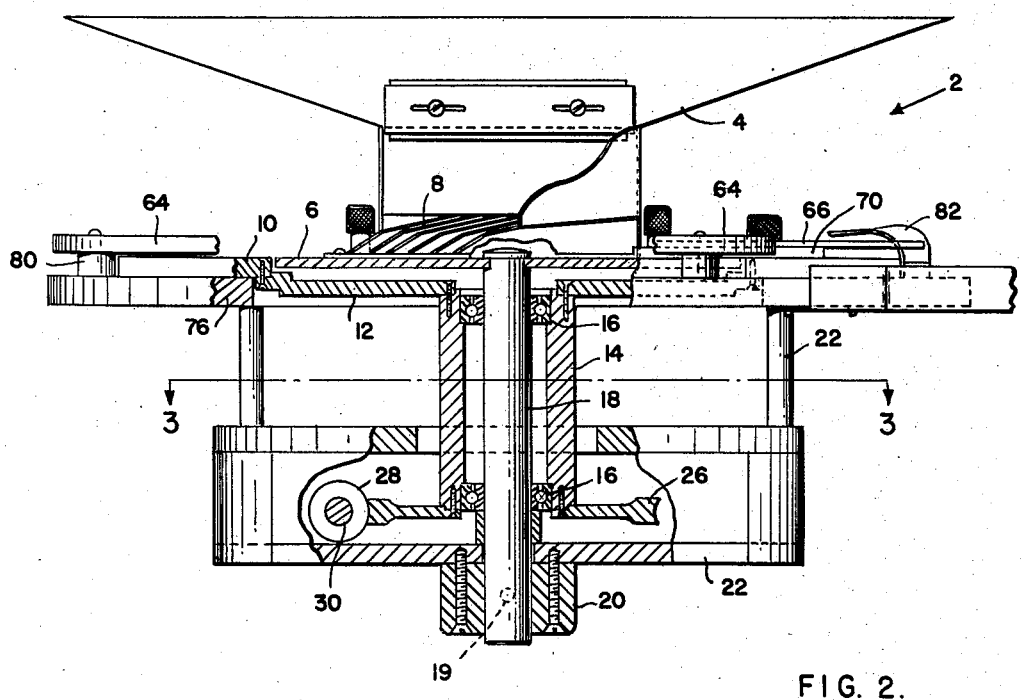
Figure 2 is a front elevation, partially broken away, of the device of Figure 1.
Figures 4, 5:
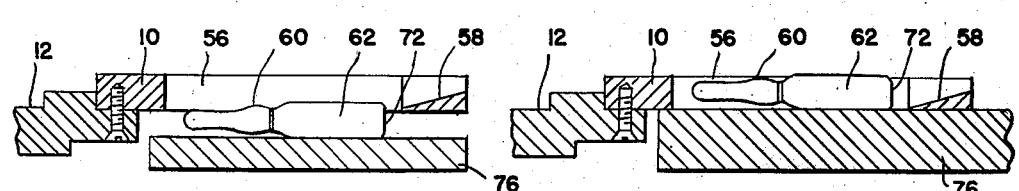
Figure 4 is a vertical section taken on the plane indicated by the line 4—4 in Figure 1.
Figure 5 is a vertical section taken on the plane indicated by the line 5—5 in Figure 1.
Figure 6:
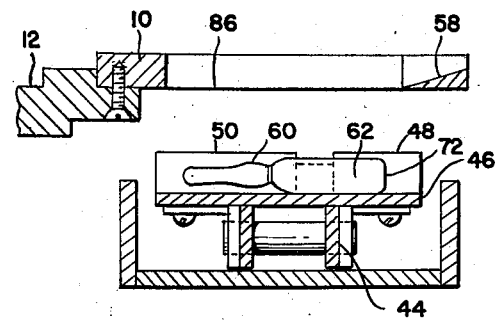
Figure 6 is a vertical section taken on the plane indicated by the line 6—6 in Figure 1.
Figure 3:
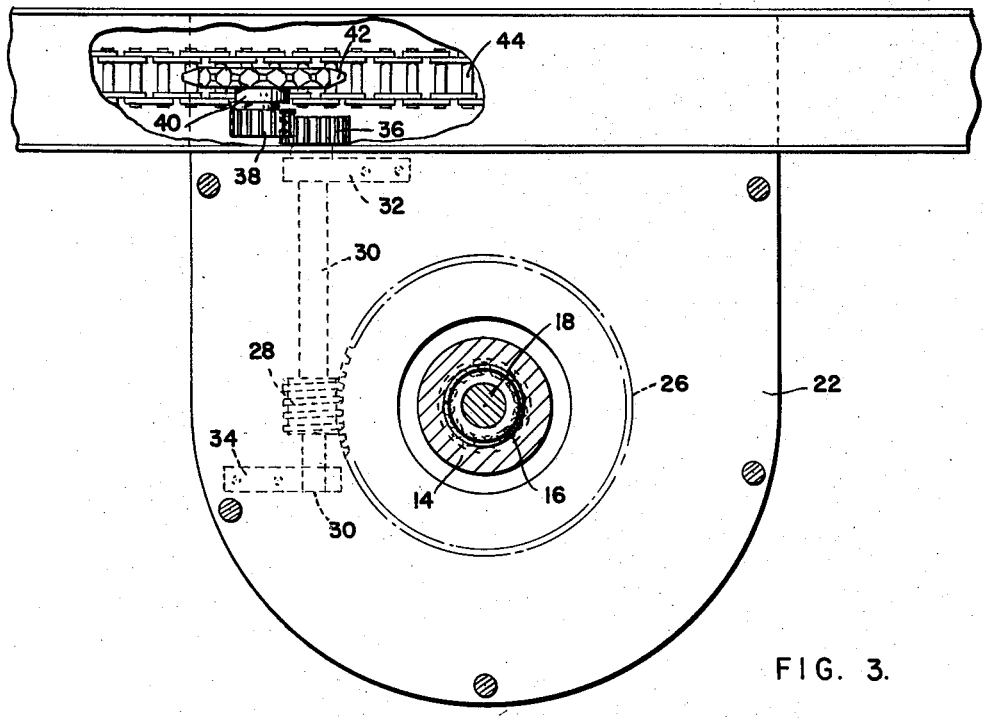
Figure 3 is a horizontal section taken on the plane indicated by the line 3—3 in Figure 2.
Figure 11:
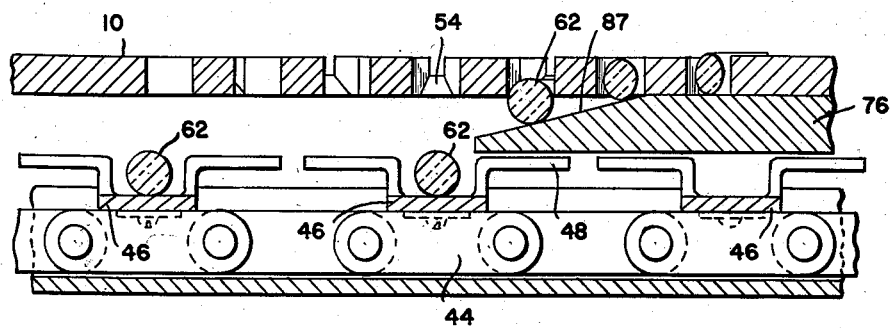
Figure 11 is a vertical section taken on the plane indicated by the line 11—11 in Figure 1.
Figure 7:
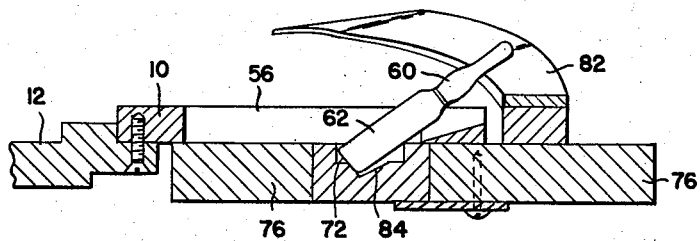
Figure 7 is a vertical section taken on the plane indicated by the line 7—7 in Figure 1.
Figure 8:
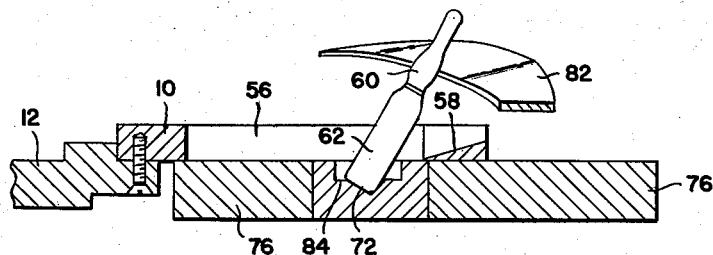
Figure 8 is a vertical section taken on the plane indicated by the line 8—8 in Figure 1.
Figure 9:
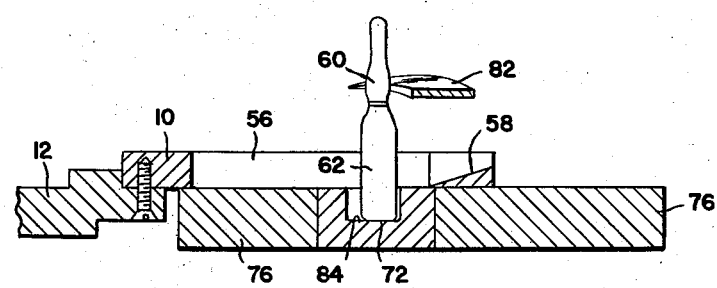
Figure 9 is a vertical section taken on the plane indicated by the line 9—9 in Figure 1.
Figure 10:
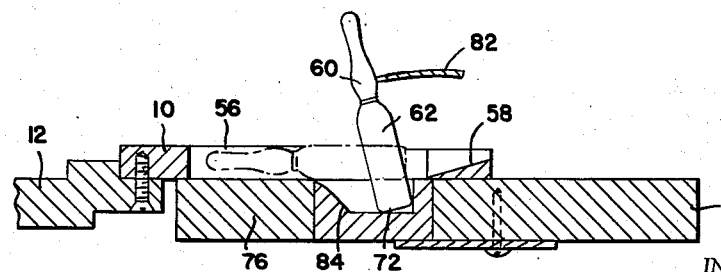
Figure 10 is a vertical section taken on the plane indicated by the line 10—10 in Figure 1.

A conveyor in the form of a rotatable ring 10 is mounted adjacent the outer circumference of plate 6. Ring 10 is secured to a ring 12 which, in turn, is secured to a hub 14 mounted for rotation on bearings 16 which are secured to center post 18 which also acts to support plate 6. Post 18 is secured by a set screw 19 to a block 20 which is, in turn, secured to a supporting frame 22. A worm gear 26 secured to the lower end of hub 14 is driven by a worm 28 secured to a shaft 30. Shaft 30 is mounted in bearing blocks 32 and 34 and has a gear 36 which is driven by a gear 38 on stub shaft 40. A sprocket 42, secured to stub shaft 40, engages a conveyor chain 44 which acts to support conveyor plates 46 carrying separating pads 48 and 50. This drive acts to rotate ring 10 counterclockwise as viewed in Figure 1.

Ring 10 is provided with radially extending openings 54 for the reception of ampules. Openings 54 have an enlarged portion 56 adapted to receive an ampule irrespective of its orientation, that is, whether the neck is pointing towards the outer or inner circumference of ring 10. Each opening 54 is also provided with a reduced inclined outer portion 58 which is large enough to receive the ampule neck 60 but is not large enough to permit the entry of an ampule body 62. Openings 54 extend entirely through ring 10 and also extend through to the outer periphery of ring 10 permitting neck 60 to extend outwardly beyond the outer circumference of ring 10.

The device 2 is also provided with an arcuate transparent stop 64 which acts to prevent ampules from spilling over the front of the device during the loading operation. A transparent guide 66 acts to push off ampules which have not been seated in openings 54 into a tray 67. However, covers 64 and 66 and tray 67 are not essential for the satisfactory operation of the device 2.

A cam 70 secured to the underside of cover 66 is positioned so that it will engage the base 72 of an ampule but not low enough to engage a neck 60. Ring 10 is only slightly thinner than the thickness of the large end of the ampule so that the large end projects above the ring while the neck is below the level of the top of the ring. Cam 70 is adapted on engaging a base 72 to cam the ampule neck 60 outwardly so as to extend beyond the outer circumference of ring 10.

A supporting plate 76, which is fixedly secured to frame 22 below ring 10, acts to support the ampules in openings 54. Plate 76 also acts to support cover 64 by post 80. Mounted on plate 76 is a cam 82 adapted to engage an ampule neck 60 which projects beyond the outer circumference of ring 10. Cam 82 is developed to lift the ampule upwardly sufficiently far to topple it over in the reverse direction thus reversing the orientation of all ampules whose neck 60 extends outwardly. A groove 84 in supporting plate 76 engages the base 72 of an ampule while the ampule is in engagement with cam 82 thus preventing the ampule from sliding away from the cam.

Plate 76 terminates at 86 at the end of sloping face 87 permitting the ampules to discharge onto a plate 46 to be conveyed away from the orienting device.

It is believed that the operation of the orienting device will be obvious from the above description. It will, however, be reviewed briefly. Ampules are fed from hopper 4 and into fence member 8 which orients the ampules for loading. The operator advances the ampules radially towards ring 10 and urges the ampules onto ring 10 to permit them to fall into openings 54 with the neck 60 extending either outwardly or inwardly. The ampules in openings 54 whose necks extend inwardly are carried around by ring 10 and discharged at 86 without their orientation being changed. In the case of the ampules whose necks are extending outwardly, they are carried around by ring 10 until engaged by cam 70 where they are forced outwardly until their neck portions extend beyond the outer periphery of ring 10. Necks 60 are then engaged by cam 82 while bases 72 are held in groove 84 and cam 82 raises the ampules until they topple over into openings 54 in the reverse direction. The thus reoriented ampules are then carried around and discharged at 86 onto the conveyor. It will thus be clear that all of the ampules will be oriented with their necks extending inwardly.

It is not desired to be limited except as set forth in the following claims.

What is claimed is:

1. An ampule orienting device comprising a conveyor having openings for the reception of ampules, said openings being substantially perpendicular to the direction of movement of the conveyor and extending to one edge of the conveyor, a supporting member below said conveyor for the support of said ampules in said openings, means adapted to engage the bases of the ampules which extend away from said edge of the conveyor and advance them outwardly until the neck portions extend beyond said edge of the conveyor, and a reversing cam adapted to engage the neck of each ampule which extends beyond said edge of the conveyor to lift the thus extended ampule and topple it into its opening with the neck extending away from said edge of the conveyor.

2. An ampule orienting device comprising a conveyor having openings for the reception of ampules, said openings being substantially perpendicular to the direction of movement of the conveyor and extending to one edge of the conveyor, a supporting member below said conveyor for the support of said ampules in said openings, means adapted to engage the bases of the ampules which extend away from said edge of the conveyor and advance them outwardly until the neck portions extend beyond said edge of the conveyor, and a reversing cam adapted to engage the neck of each ampule which extends beyond said edge of the conveyor to lift the thus extended ampule and topple it into its opening with the neck extending away from said edge of the conveyor, said supporting member having a groove to support the bases of the ampules during their engagement with the reversing cam and said supporting member terminating at a point beyond said reversing cam to effect the discharge of the oriented ampules.

3. An ampule orienting device comprising a rotating member having radially extending openings for the reception of ampules, said openings extending to the outer periphery of said ring, a supporting member below said ring for the support of said ampules in said openings, a cam adapted to engage the bases of the ampules which extend towards the center of the ring and advance them outwardly until the neck portions extend beyond the outer periphery of said ring, and a reversing cam adapted to engage the neck of each ampule which extends beyond the outer periphery of said ring to lift the thus extended ampule and topple it into its opening with the neck extending inwardly.

4. An ampule orienting device comprising a rotating member having radially extending openings for the reception of ampules, said openings extending to the outer periphery of said ring, a supporting member below said ring for the support of said ampules in said openings, a cam adapted to engage the bases of the ampules which extend towards the center of the ring and advance them outwardly until the neck portions extend beyond the outer periphery of said ring, and a reversing cam adapted to engage the neck of each ampule which extends beyond the outer periphery of said ring to lift the thus extended ampule and topple it into its opening with the neck extending inwardly, said supporting member having a groove to support the bases of the ampules during their engagement with the reversing cam.

5. An ampule orienting device comprising a rotating member having radially extending openings for the reception of ampules, said openings having enlarged inner portions adapted to accommodate ampules with their necks extending outwardly and inwardly, each opening having a reduced outer portion capable of receiving an ampule neck and too small to receive the ampule body and extending to the outer periphery of said ring, a supporting member below said ring for the support of said ampules in said openings, a cam adapted to engage the bases of the ampules which extend towards the center of the ring and advance them outwardly until the neck portions extend beyond the outer periphery of said ring, and a reversing cam adapted to engage the neck of each ampule which extends beyond the outer periphery of said ring to lift the thus extended ampule and topple it into its opening with the neck extending inwardly.

6. An ampule orienting device comprising a rotating member having radially extending openings for the reception of ampules, said openings having enlarged inner portions adapted to accommodate ampules with their necks extending outwardly and inwardly, each opening having a reduced outer portion capable of receiving an ampule neck and too small to receive the ampule body and extending to the outer periphery of said ring, a supporting member below said ring for the support of said ampules in said openings, a cam adapted to engage the bases of the ampules which extend towards the center of the ring and advance them outwardly until the neck portions extend beyond the outer periphery of said ring, and a reversing cam adapted to engage the neck of each ampule which extends beyond the outer periphery of said ring to lift the thus extended ampule and topple it into its opening with the neck extending inwardly, said supporting member having a groove to support the bases of the ampules during their engagement with the reversing cam.

7. An ampule orienting device comprising a rotating member having radially extending openings for the reception of ampules, said openings having enlarged inner portions adapted to accommodate ampules with their necks extending outwardly and inwardly, each opening having a reduced outer portion capable of receiving an ampule neck and too small to receive the ampule body and extending to the outer periphery of said ring, a supporting member below said ring for the support of said ampules in said openings, a cam adapted to engage the bases of the ampules which extend towards the center of the ring and advance them outwardly until the neck portions extend beyond the outer periphery of said ring, a reversing cam adapted to engage the neck of each ampule which extends beyond the outer periphery of said ring to lift the thus extended ampule and topple it into its opening with the neck extending inwardly, and said supporting member terminating at a point beyond said reversing cam to effect the discharge of the oriented ampules.

8. An ampule orienting device comprising a rotating member having radially extending openings for the reception of ampules, said openings having enlarged inner portions adapted to accommodate ampules with their necks extending outwardly and inwardly, each opening having a reduced outer portion capable of receiving an ampule neck and too small to receive the ampule body and extending to the outer periphery of said ring, a supporting member below said ring for the support of said ampules in said openings, a cam adapted to engage the bases of the ampules which extend towards the center of the ring and advance them outwardly until the neck portions extend beyond the outer periphery of said ring, a reversing cam adapted to engage the neck of each ampule which extends beyond the outer periphery of said ring to lift the thus extended ampule and topple it into its opening with the neck extending inwardly, said supporting member having a groove to support the bases of the ampules during their engagement with the reversing cam and said supporting member terminating at a point beyond said reversing cam to effect the discharge of the oriented ampules.

9. An ampule orienting device comprising a rotating member having radially extending openings for the reception of ampules, said openings having enlarged inner portions adapted to accommodate ampules with their necks extending outwardly and inwardly, each opening having a reduced outer portion capable of receiving an ampule neck and too small to receive the ampule body and extending to the outer periphery of said ring, a supporting member below said ring for the support of said ampules in said openings, a cam adapted to engage the bases of the ampules which extend towards the center of the ring and advance them outwardly until the neck portions extend beyond the outer periphery of said ring, a reversing cam adapted to engage the neck of each ampule which extends beyond the outer periphery of said ring to lift the thus extended ampule and topple it into its opening with the neck extending inwardly, said supporting member having a groove to support the bases of the ampules during their engagement with the reversing cam, said supporting member terminating at a point beyond said reversing cam to effect the discharge of the oriented ampules and a conveyor passing below said discharge opening in the supporting member.

10. The ampule orienting device of claim 9 in which means are provided to drive the conveyor and the rotating member synchronously.

References Cited in the file of this patent

UNITED STATES PATENTS 1,875,423   Daniels _____ Sept. 6, 1932